(12) United States Patent
Vogler et al.

(10) Patent No.: US 9,275,415 B2
(45) Date of Patent: Mar. 1, 2016

(54) SYSTEM FOR LATENCY REDUCTION IN HIGH FREQUENCY TRADING NETWORKS

(75) Inventors: Jerry Vogler, Buffalo Grove, IL (US); Mark Thomas Nelson, Jr., Batavia, IL (US); Patrick Wade, Elburn, IL (US); Michael S. O'Neill, LaGrange, IL (US)

(73) Assignee: Cisco Technology, Inc., San Jose, CA (US)

( * ) Notice: Subject to any disclaimer, the term of this patent is extended or adjusted under 35 U.S.C. 154(b) by 294 days.

(21) Appl. No.: 13/486,902

(22) Filed: Jun. 1, 2012

(65) Prior Publication Data
US 2013/0325684 A1   Dec. 5, 2013

(51) Int. Cl.
*H04B 10/20* (2006.01)
*G06Q 40/04* (2012.01)

(52) U.S. Cl.
CPC .................................. *G06Q 40/04* (2013.01)

(58) Field of Classification Search
CPC ............. H04J 14/0204; H04J 14/0209; H04Q 11/0005; H04Q 11/0067; G06Q 40/04
USPC .............................................. 398/70–72, 82
See application file for complete search history.

(56) References Cited

U.S. PATENT DOCUMENTS

| | | | |
|---|---|---|---|
| 6,675,316 B1* | 1/2004 | Harper | 714/4.3 |
| 2004/0212876 A1* | 10/2004 | Bhowmik et al. | 359/349 |
| 2005/0036786 A1* | 2/2005 | Ramachandran et al. | 398/70 |
| 2010/0166173 A1* | 7/2010 | Yang et al. | 379/402 |
| 2010/0189433 A1* | 7/2010 | Trojer | 398/8 |
| 2011/0208634 A1* | 8/2011 | Sylvester | 705/37 |
| 2012/0121265 A1* | 5/2012 | Suvakovic et al. | 398/66 |
| 2012/0141139 A1* | 6/2012 | Bakhru et al. | 398/158 |
| 2012/0263458 A1* | 10/2012 | Wen et al. | 398/28 |
| 2014/0143121 A1* | 5/2014 | Stevens | 705/37 |

OTHER PUBLICATIONS

Zeptonics, "Network Devices—The first network appliance we're bringing to market is the world's fastest 10GbE switching device, optimised for trading", http://www.zeptonics.com/network-devices/index.html, 2012; pp. 1-3.
Zeptonics, "ZeptoMux—10GbE 23-to-1 multiplexing switch with a fibre-to fibre latency (including SFP+s) of ~130ns", http://www.zeptonics.com/network-devices/zeptomux.html, 2012; pp. 1-6.
Zeptonics, "Overview ZeptoMux 10GbE multiplexing switch ~130ns latency", 2012, pp. 1-2.
Zeptonics, "News and Events—Zeptonics announcements and trade show details—News—Press Release—Zeptonics previews 5nanosecond dual-purpose network device—ZeptoLink", http://www.zeptonics.com/news/index.html, Jun. 20, 2012, pp. 1-6.
Zeptonics, "ZeptoLink—50-port layer 1 device with a fibre-to-fibre latency of ~5ns", http://www.zeptonics.com/network-devices/zeptolink.html, 2012, pp. 1-4.
Zeptonics, "ZeptoLink—Layer 1 circuit switch ~5ns latency", http://www.zeptonics.com/network-devices/zeptolink.html, 2012, pp. 1-2.

(Continued)

*Primary Examiner* — Dzung Tran (57) ABSTRACT

A system includes an optical splitter that may receive an optical signal containing trading information from over an exchange network. The optical splitter may split the optical signal at a physical layer into a plurality of signals and transmit the plurality of signals toward a plurality of hosts at a customer end, which may execute transactions using the trading information.

21 Claims, 9 Drawing Sheets

(56) References Cited

OTHER PUBLICATIONS

A.A.M. Saleh et al., "Reflective Single-Mode Fiber-Optic Passive Star Couplers", Journal of Lightwave Technology, vol. 6, No. 3, Mar. 1988, pp. 392-398.

Zeptonics, "Overview ZeptoMux 10GbE multiplexing switch ~130ns latency", Jun. 14, 2012, pp. 1-2.

Zeptonics, "ZeptoLink—Layer 1 circuit switch ~5ns latency", http://www.zeptonics.com/network-devices/zeptolink.html, Jun. 20, 2012, pp. 1-2.

\* cited by examiner

SYSTEM FOR LATENCY REDUCTION IN HIGH FREQUENCY TRADING NETWORKS

FIELD

The present embodiments relate to high frequency trading and, more particularly, to minimizing or reducing an amount of latency generated when communicating trading information from an exchange to a customer.

BACKGROUND

Some trading environments may include high frequency trading where customers use trading algorithms to execute trades or transactions of securities, such as stocks or options. The customers may receive trading information from an exchange through a network and use the trading information to execute their algorithms.

DETAILED DESCRIPTION

Overview

A system includes a physical layer splitter that may be configured to receive a signal sent from over an exchange network. The signal may contain trading information used to execute one or more transactions. The physical layer splitter may also be configured to split the signal at a physical layer into a plurality of signals. In addition, the physical layer splitter may be configured to transmit the plurality of signals toward a plurality of hosts to execute the transactions.

DESCRIPTION OF EXAMPLE EMBODIMENTS

The present disclosure describes a system for high frequency trading that includes a physical layer splitter that may split a signal carrying trading information used to make an order or transaction. The physical layer splitter may split the signal into a plurality of signals at a physical layer or Layer 1 of the Open Systems Interconnection (OSI) model. The plurality of signals may be sent to a customer, which may have a plurality of hosts that use the trading information contained in the optical signals to make an order or a transaction. By splitting the signal at the physical layer, latency generated when communicating the trading information to the customer may be lower than latency generated in alternative systems that split the optical signal at the data link layer (i.e., Layer 2 of the OSI model) or the network layer (i.e., Layer 3 of the OSI model).

Figure 1:
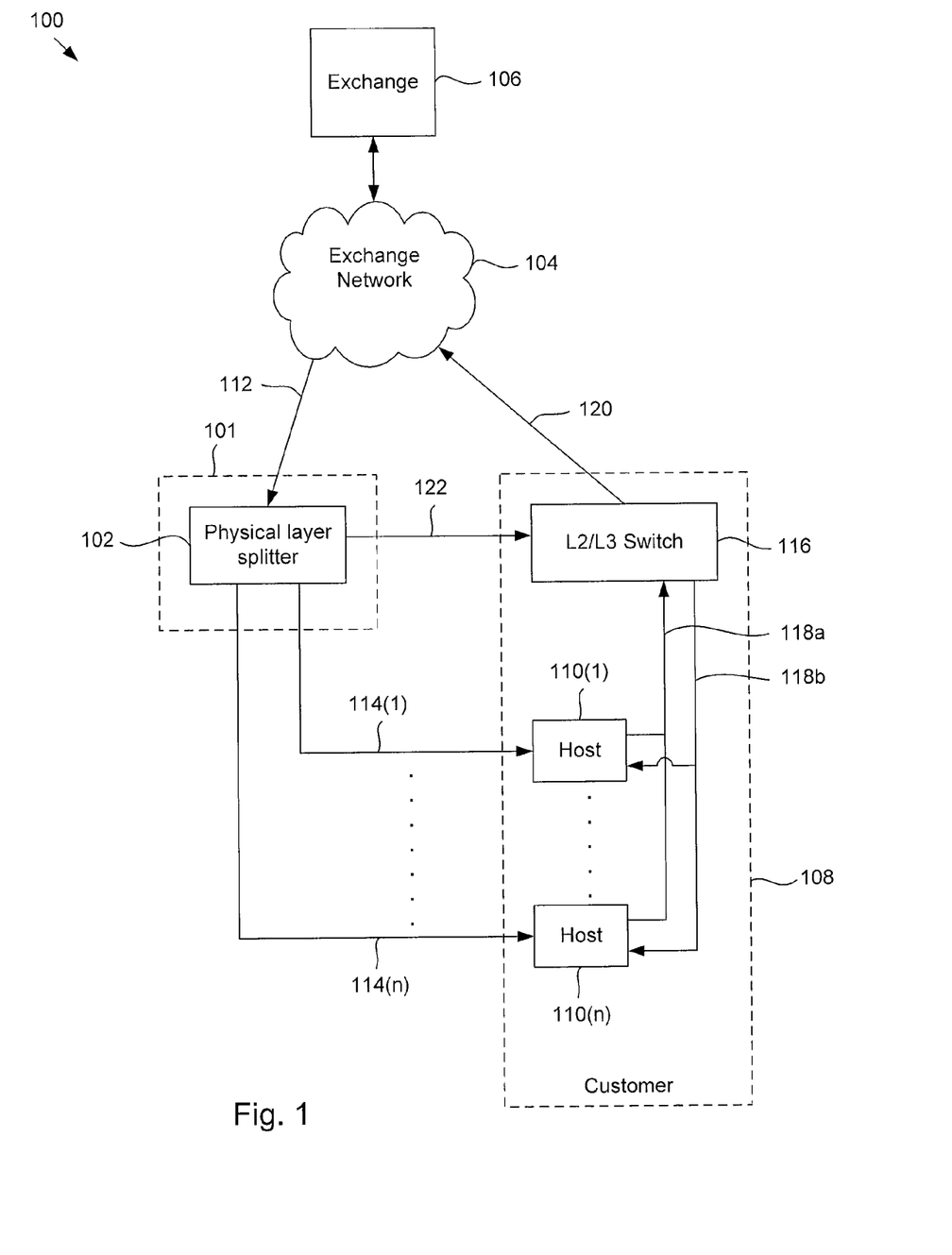
FIG. 1 illustrates a trading environment that includes an example system that may be used to minimize or reduce an amount of latency produced when communicating trading information from an exchange to a customer.

FIG. 1 shows a trading environment 100 that includes an example system or architecture 101 configured to minimize, optimize for, and/or reduce an amount of latency produced when communicating trading information from an exchange to a customer. The system 101 may include a physical layer splitter 102 that is configured to receive a signal containing trading information from an exchange network 104. The physical layer splitter 102 may split or divide the signal into a plurality of signals at the physical layer, and then send the plurality of signals to a customer 108 that performs the trading.

The exchange network 104 may be a communication network over which an exchange 106 may communicate information with the customer 108. The exchange 106—such as a stock exchange, securities exchange, futures exchange, or options exchange—may provide services to a customer 108 that makes orders or transactions to trade stocks, bonds, options, or other securities. The customer 108 may have or include one or more hosts 110. FIG. 1 shows the customer 108 having an n-number of hosts 110(1) to 110(n). Each of the hosts 110(1) to 110(n) may include one or more computing devices, such as a computer, a server, an integrated circuit (IC) such as a field programmable gate array (FPGA) or an application specific integrated circuit (ASIC), or any other type of electronic device, apparatus, or appliance that may be configured to receive the trading information and execute one or more trading algorithms to perform a transaction using the trading information.

The trading information provided by the exchange 106 may include various information, such as market data, that the hosts 110(1) to 110(n) may use to execute a transaction. In some trading environments, such as high frequency trading, the timing in which the hosts 110(1) to 110(n) receive the trading information may be critical, particularly where being the first to make the transaction prevents competing customers from making the same transaction. The faster that a host 110 may receive the trading information, the earlier or sooner the host 110 may perform the transaction, thus providing the customer 108 with a competitive advantage. Given the high processing speeds of computing devices executing the trading algorithms, differences in which competing customers may receive the trading information, even in small quantities of milliseconds, microseconds, or nanoseconds, may be significant.

In some trading environments, the exchange 106 and the customer 108 (along with competing customers) may be co-located, such as by being located in the same building, area, or room. In these environments, the exchange 106 may be configured to provide the trading information over the exchange network to the customer 108 using cabling, such as fiber optic cabling. A connection 112, such as a fiber optic cable, may be used to connect the customer 108 with the exchange 106. The fiber optic cable 112 may transmit a fiber optic signal containing the trading information. Where the customer 108 has multiple hosts 110(1) to 110(n), the fiber optic signal may be split so that the multiple hosts 110(1) to 110(n) may each receive the trading information.

The example system 101, which may be referred to as a physical layer splitting and/or regeneration system, may include the physical layer splitter 102 to receive the optical signal from the exchange network 104 and split the optical signal into a plurality of optical signals for transmission to the multiple hosts 110(1) to 110(n). The physical layer splitter 102 may be connected to the fiber optic cable 112 to receive the optical signal. The optical splitter 102 may be configured to split the optical signal into a plurality of optical signals, each containing the trading information. A number of the plurality of optical signals that are generated may be equal to a number of the hosts 110(1) to 110(n). In one configuration of the example system 101, the number of hosts 110(1) to 110(n) and the number of optical signals generated by the optical splitter 102 may be three, although other numbers may be used.

The power for each of the plurality of optical signals may be the same and may also be proportional to the number of optical signals that are generated. Also, each of the plurality of optical signals may have a power that is a fraction or a percentage of the optical signal received by the optical splitter 102. As an example, where four optical signals are generated, the power for each of the optical signals may be 25% of the power of the optical signal received by the optical splitter 102.

The physical layer splitter 102 may be a device or apparatus that is implemented in hardware. Additionally, the physical layer splitter 102 may be configured to split the optical signal at the physical layer or Layer 1 of the OSI model. The physical layer splitter 102 may be configured to split the optical signal in various ways, such as by making copies of the optical signal or splitting the light of the optical signal through mirroring. In addition or alternatively, various technologies may be used and/or implemented to split the optical signal, such as Fused Biconical Taper (FBT), Planar Lightwave Circuit (PLC), and/or using a passive star coupler design, as examples. An example physical layer splitter 102 may be an optical splitter, such as a passive optical splitter.

When the physical layer splitter 102 splits the optical signal at the physical layer, the physical layer splitter 102 may split the optical signal without generating data packets and/or copying or storing the signal or data packets in memory. When the optical signal is split, an amount of latency or delay may occur when communicating the trading information from the exchange network 104 to the customer 108. However, by splitting the optical signal at the physical layer and/or by splitting the optical signal without copying and/or storing the signal in memory, the amount of latency may be relatively low, such as around two to five nanoseconds.

In alternative systems, the optical signal may be split at other layers. For example, the optical signal may be split at Layer 2 or Layer 3, such as by using one or more Layer 2 and/or a Layer 3 (L2/L3) switches or routers. In order to split at Layer 2 and/or Layer 3, the L2/L3 switches or routers may perform various operations, such as generating and/or copying frames and/or packets, performing frame/packet lookups, scheduling, and/or buffering, as examples. Due to performing the various operations, the amount of latency generated using an L2/L3 switch or router may be significantly higher than the amount of latency generated when splitting the optical signal at the physical layer. In some examples, the amount of latency may be around 20-25 milliseconds.

Additionally, L2/L3 switches or routers may have other drawbacks, such as when generating and/or copying frames or packets from the optical signal to communicate the trading information, the L2/L3 switches or routers may be prone to dropping packets, positioning packets out of order, corrupting packets, and/or adding jitter to the overall signal, as examples. These drawbacks may occur when bursting multicasting packets, for example, which as explained above, may require lookups, scheduling and/or buffering. Additionally, multicast bursts includes transmission and/or exchanges of large amount of traffic, which may create added time for the L2/L3 switches or routers to process the traffic and/or jitter. On the other hand, a physical layer splitter may perform the splitting without any performance of lookups, packet or frame copying, buffering, scheduling, or any other Layer 2 or Layer 3 operations that are performed to split the signal. As such, the use of a physical layer splitter, such as an optical splitter, may provide a faster and/or a more reliable transmission of the trading information to the hosts 110(1) to 110(n) than a L2/L3 switch, router, or other L2/L3 device or apparatus capable of splitting the optical signal. Additionally, the physical layer splitter 102 may be used to bypass and/or avoid sending the optical signal to an L2/L3 switch or router before the signals reach the hosts.

After the signal received by the physical layer splitter 102 is split and the plurality of signals are generated, the physical layer splitter 102 may transmit the signals to the hosts 110 through connections 114(1) to 114(n). The hosts 110(1) to 110(n) may include interfaces, such as market data network interface cards, to receive the signals from over the connections 114(1) to 114(n). Where the signals are optical signals, the connections 114(1) to 114(n) may include fiber optic cables. In some example configurations, the connections 114 may be unidirectional or simplex connections, such as tap/optical switch simplex connections, that are configured to transmit information in a single direction, such as from the physical layer splitter 102 to the hosts 110(1) to 110(n), and not from the hosts 110(1) to 110(n) to the physical layer splitter 102.

Upon reception of the optical signals, each of the hosts 110(1) to 110(n) may use the trading information contained in the optical signal to execute one or more transactions, such as through execution of one or more of the trading algorithms. Additionally, the hosts 110(1) to 110(n) may be configured to transmit information indicative and/or associated with an executed transaction to the exchange network 104. The hosts 110(1) to 110(n) may include interfaces, such as order execution network interface cards, to transmit the information indicative of and/or associated with the executed transaction. In addition, the hosts 110(1) to 110(n) may transmit the information using and/or in accordance with various packetization processes, standards, or protocols, such as Transmission Control Protocol (TCP) as an example.

In some configurations, the hosts 110 may communicate the executed transaction information to the exchange network 104 through a switch 116, such as a L2/L3 switch or router, which may be implemented in hardware, software, or a combination thereof. The switch 116 may communicate with the exchange 106 and/or over the exchange network 104 to request traffic and/or to maintain a protocol state (e.g., Protocol Independent Multicast (PIM), Internet Group Management Protocol (IGMP), Border Gateway Protocol (BGP)) that may used and/or required for communication with the exchange 106. By maintaining a protocol state, trading information, and/or other traffic may be communicated from the exchange 106 to the customer 108. That is, in some configurations, without maintenance of the protocol state, the exchange 106 may not communicate information to the customer 108.

One or more pairs of connections 118, or duplex connections, may be used to connect the outputs of the hosts 110 with the L2/L3 switch 116. One connection 118a of the pair may be used to transmit the information of the executed transaction from the hosts 110 to the L2/L3 switch 116. The other connection 118b of the pair may be used to transmit information, such as information related to a protocol state (e.g., IGMP or Address Resolution Protocol (ARP)), from the L2/L3 switch 116 to the hosts 110. In some example configurations, the connections 118a, 118b may be fiber optic cables.

Upon reception of the executed transaction information, the L2/L3 switch 116 may be configured to transmit the executed transaction information to the exchange network 104. The L2/L3 switch 116 may transmit the executed transaction information to the exchange network 104 using a connection 120, which may be a fiber optic cable in some examples. The connection 120 may be one connection of a pair of connections or of a duplex connection that is used to communicate information between the exchange network 104 and the customer 108. The other connection of the pair may include the connection 112 that delivers the trading information to the physical layer splitter 102.

In some trading environments, the customer 108 may be configured to establish a connection with the exchange network 104 by configuring the system 101 with the customer 108 so that from the perspective of the exchange 106, the exchange 106 is both sending information to and receiving information from the hosts 110 through the L2/L3 switch 116. From the perspective of the exchange 106, the system 101, including the physical layer splitter 102, may be operationally invisible. Without providing such a perspective to the exchange 106, the exchange 106 may remove its connection with the customer 108, and the customer 108 may be unable to receive information from and/or transmit information to the exchange 106.

To configure the system 101 with the customer 108 so that from the perspective of the exchange 106, the exchange 106 is transmitting and receiving information through the L2/L3 switch 116, a connection 122 may be used to connect one of the outputs of the physical layer splitter 102 with an input of the L2/L3 switch 116. The connection 122 may include a simplex fiber optic connection that transmits information from the physical layer splitter 102 to the L2/L3 switch 116. The transmitted information sent to the L2/L3 switch may be one of the plurality of optical signals that the physical layer 102 generated from the optical signal containing the trading information. The L2/L3 switch 116 may be configured to receive the signal from the physical layer splitter 102 without performing further processing or taking further action on the signal. Alternatively, the L2/L3 switch 116 may transmit the signal to one or more of the hosts 110(1) to 110(n) via connection 118(b). In this configuration, the hosts 110(1) to 110(n) may be configured to receive two copies of the signals transmitted from the exchange 106—one from the system 101, and another from the switch 116. By connecting an output of the physical layer splitter 102 with the L2/L3 switch, network connection between the exchange 106 and the customer 108 may be achieved and/or remain intact.

As previously described, the power levels of the signals being output from the physical layer splitter 102 may be proportional to the number of signals being output from the physical layer splitter 102. For example, if four signals are output (one signal being sent to the L2/L3 switch 116 and the remaining three being sent to the hosts 110), then each signal may have about 25% of the power level of the signal that is input to the physical layer splitter 102. In some configurations where the customer 108 has a relatively low number of hosts 110, such as three, a power level that is 25% of the power level of the input signal may be an adequate power level for each of the hosts 110 to process and/or handle. However, in other configurations where the customer 108 has a larger number of hosts 110, such as ten, twelve, or sixteen, the output signals may not have adequate power levels for the hosts 110 to process and/or handle. When the physical layer splitter 102 splits the incoming signal ten, twelve, or sixteen ways, the power levels of the output signals may be inadequate and/or below a threshold power level at which the hosts may process and/or handle the signals. Accordingly, for some customer configurations, further processing and/or modification of the output signals may be needed before they are sent to the hosts.

Figure 2:
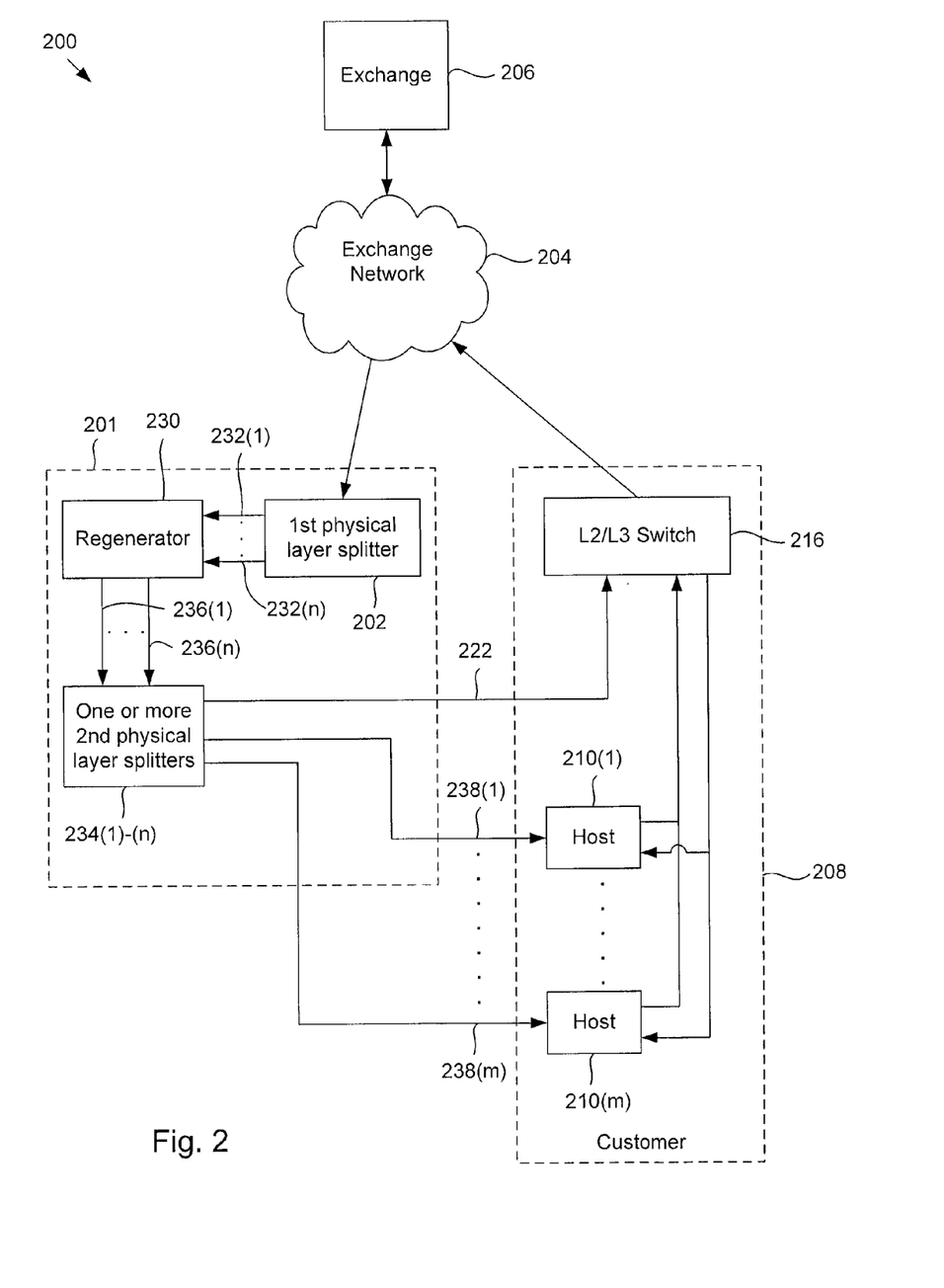
FIG. 2 illustrates a trading environment that includes a second example system that may be used to minimize or reduce an amount of latency produced when communicating trading information from an exchange to a customer.

FIG. 2 shows a trading environment 200 that includes an alternative example system 201, which may be referred to as a physical layer splitting and regeneration system, configured to minimize and/or reduce an amount of latency produced when communicating trading information from an exchange to a customer. The system 201 may include two stages of splitting the signal received from an exchange network and a regeneration stage, which may increase the power levels of optical signals output from the first physical layer splitting stage.

For example, the system 201 may include a first physical layer splitter 202, such as an optical splitter, which may be the same as or similar to the first physical layer splitter 102 shown in FIG. 1. The first physical layer splitter 202 may be configured to receive a signal, such as an optical signal, containing trading information from an exchange network 204. The first physical layer splitter 202 may be configured to split the received signal at the physical layer into a plurality of signals, and transmit the plurality of signals to a regenerator or a repeater 230. The plurality of signals may be transmitted to the regenerator 230 over an n-number of connections 232(1) to 232(n), which may include fiber optic cables and/or unidirectional or simplex connections, as previously described.

Upon receipt of the plurality of optical signals from the first physical layer splitter 202, the regenerator 230 may be configured to regenerate each of the signals, which may increase the power level of each of the signals. The regenerator 230 may regenerate the optical signals by converting the optical signals to electrical signals, processing the electrical signals, and then retransmitting the optical signals, which may be referred to as an optical-electrical-optical (OEO) process. In addition or alternatively, the regenerator 230 may regenerate the optical signals at the physical layer or Layer 1. The regeneration process may produce a relatively low amount of latency, such as about four nanoseconds in some examples. The low amount of latency may achieved for regeneration through the use of an ultra low latency loopback mode, in which a single optic or single input/output (I/O) pair is used per simplex path, such as for each of connections 232(1)-232(n) and 236(1)-236(n). The amount of latency produced through regeneration may be significantly lower than latency produced by amplifiers, such as those that use Erbium Doped Fiber Amplification (EDFA) or Raman amplification, as examples. Latency produced through amplification may be in a range of about 150-250 nanoseconds.

In alternative configurations, an active tap that is configured to perform both optical splitting and regeneration may be used. Where an active tap is used, the active tap may replace the first physical layer splitter 202 and the regenerator 230. That is, the first physical layer splitter 202 and the regenerator 230 may be combined as a single unit or component of the system 201.

After the optical signals are regenerated, the regenerated optical signals may be transmitted to one or more second physical layer splitters 234(1) to 234(n). A number of second physical layers splitters 234 may be equal to the number of signals output from the first physical layer splitter 202. Each second physical layer splitter 234(1) to 234(n) may be an optical splitter, such as a passive optical splitter, and/or may be configured to split a received signal into a plurality of signals at the physical layer. In addition or alternatively, each of the second physical layer splitters 234(1) to 234(n) may be configured to split the received signal at the physical layer and/or in a same or similar way that the first physical layer splitter 202 splits a received signal, such as by making copies through mirroring, as an example. The first physical layer splitter 202 and one or more of the second physical layer splitters 234(1) to 234(n) may be similar or different in the number of outputs and/or the numbers of times that the splitters 202, 234 are configured to split their respective received signals. For example, as shown in FIG. 2, the first physical layer splitter 202 may be configured to split the received signal four times. Each of the second physical layer splitters 234(1) to 234(n) may be configured to split the received signals four times, like the first physical layer splitter 202, or alternatively, a number of times other than four, which may be in a range between two and thirty-two outputs in some examples.

The plurality of regenerated signals may be transmitted to the second physical splitters 234(1) to 234(n) over an n-number of connections 236(1) to 236(n), which may include fiber optic cables and/or unidirectional or simplex connections, as previously described. The n-number of connections 236(1) to 236(n) may be same as the n-number of connections 232(1) to 232(n). After the second physical splitters 234(1) to 234(n) receive the regenerated signals from the regenerator 230, the second physical splitters 234(1) to 234(n) may each be configured to split their respective received signals a predetermined number of times, which may be in a range of about two to thirty-two, as previously described. The second physical splitters 234(1) to 234(n) may be configured to split their respective received signals the same number of times, a different number of times, or combinations thereof.

The second physical layer splitters 234(1) to 234(n) may be configured to split the regenerated signals into an m-number of signals. After the regenerated signals are split into an m-number of signals by second physical splitters 234(1) to 234(n), the signals may be transmitted to an m-number of hosts 210. The signals may be transmitted to the hosts 210 over an m-number of connections 238(1) to 238(m), which may include fiber optic cables and/or unidirectional or simplex connections, as previously described. Upon receipt of the signals, the hosts 210 may use the trading information contained in the signals to execute a transaction, as previously described.

Similar to the trading environment 100, the customer 208 in the trading environment 200 may communicate with the exchange 206 if, from the perspective of the exchange 206, the exchange 206 is both sending information to, and receiving information from, the hosts 210 through a L2/L3 switch 216. To configure the system 201 with the customer 208 so the exchange 206 may have that perspective, an input of the L2/L3 switch 216 may be connected to either an output of the first physical layer splitter 202 or an output of one of the second physical layer splitters 234(1) to 234(n). FIG. 2 shows a connection 222, which may include a fiber optic cable and/or a simplex connection, that connects an input of the L2/L3 switch 216 to an output of one of the second physical layer splitters 234(1) to 234(n).

In some configurations, connecting the L2/L3 switch 216 with one of the second physical layer splitters 234(1) to 234(n) may maximize and/or optimize the number of hosts 210 for which the system 201 may provide signals with the trading information. For example, if each of the second physical layer splitters 234(1) to 234(n) are configured to output thirty-two signals, then connecting one of the outputs from the first physical layer splitter 202 may reduce the number of signals that may be output from the second physical layer splitters 234(1) to 234(n) to the hosts 210 by thirty-two. On the other hand, if the L2/L3 switch 216 is connected to an output of one of the second physical layer splitters 234(1) to 234(n), then the number of signals that may be output to the hosts 210 may be reduced by only one.

In one example configuration, the system 201 may include four second physical layer splitters 234(1) to 234(4), each being configured to output up to thirty-two copied signals. In this example configuration, the system 201 may be configured to provide signals containing the trading information to up to 128 hosts.

In addition, in some example configurations, the physical layer splitters 202 and 234 may produce about two to five nanoseconds of latency, and the regenerator 230 may produce about four nanoseconds of latency, as previously described. As such, a system incorporating two stages of physical layer splitting and one stage of regeneration, such as the system 201, may produce about eight to fourteen nanoseconds of latency.

In some trading environments, a single stage of regeneration may not increase the power levels of the signals to adequate levels for all of the hosts to process and/or handle the signals. To increase the power of the levels to adequate levels in these trading environments, two or more stages of regeneration may be used.

Figure 3:
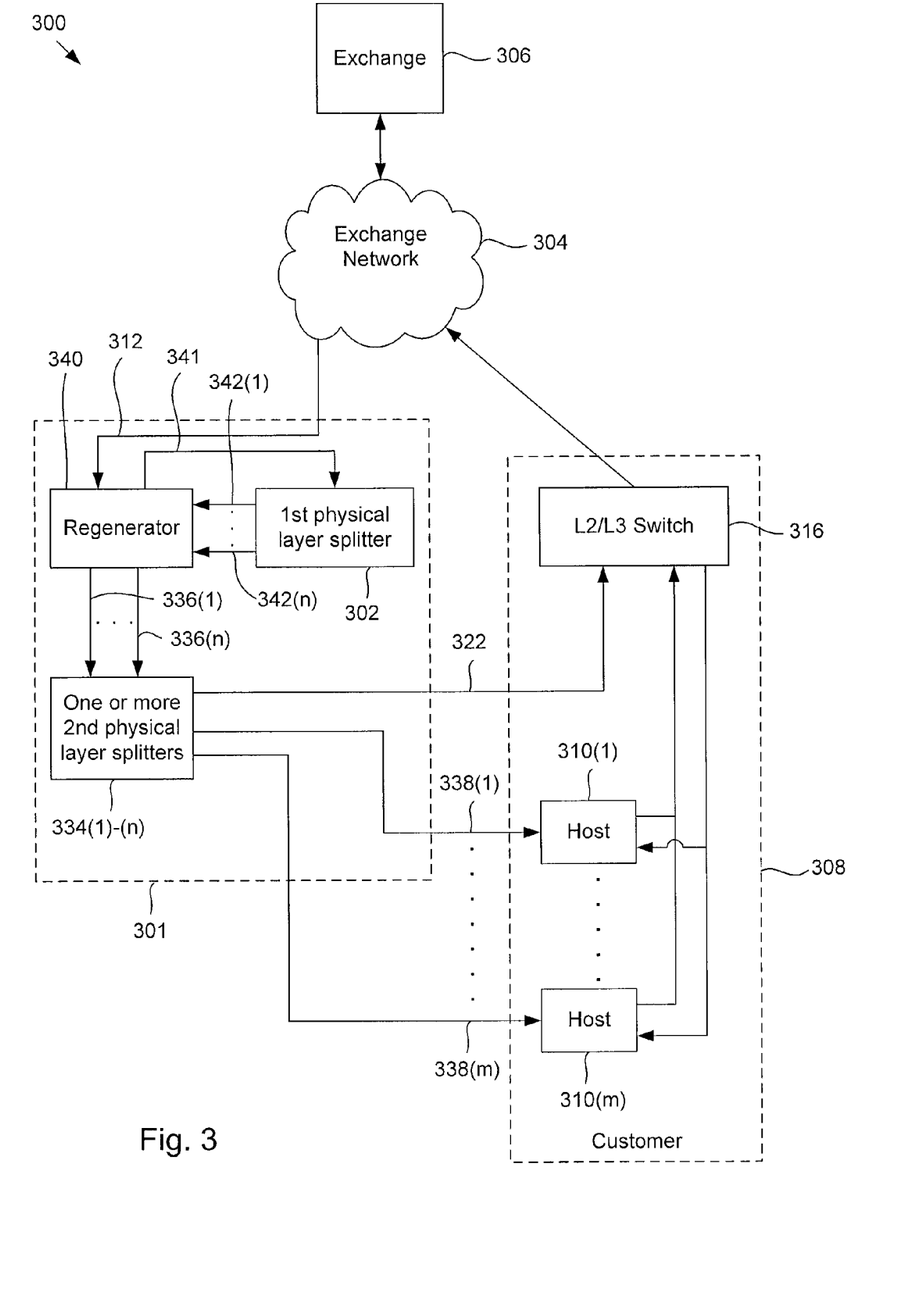
FIG. 3 illustrates a trading environment that includes a third example system that may be used to minimize or reduce an amount of latency produced when communicating trading information from an exchange to a customer.

FIG. 3 shows a trading environment 300 that includes an alternative example system 301 configured to minimize and/or reduce an amount of latency produced when communicating trading information from an exchange to a customer. The example system 301, which may be referred to as a physical layer splitting and/or regeneration system, may include a regenerator 340 that may be configured to receive a signal containing trading information from an exchange network 304. The regenerator 340 may receive the signal by being connected to connection 312, which may be a fiber optic cable.

The regenerator 340 may be configured to perform a first regeneration or a pre-regeneration by regenerating the signal received from the exchange network 304. The regenerator 340 may further be configured to output the regenerated signal to a first physical layer splitter 302 over a connection 341, such as a fiber optic cable. Upon reception of the regenerated signal from the regenerator 340, the first physical layer splitter 302 may be configured to split the regenerated signal into a plurality of signals. In some example configurations, the number of signals may be between two and sixteen. In addition, the first physical layer splitter 302 may be configured to transmit the plurality of signals back to the regenerator 340 to perform a second regeneration. In alternative configurations, a second regenerator may be used to perform the second regeneration. In still other alternative configurations, three or more regenererations may be performed. In general, one or more regenerators may be used to perform one or more regenerations. A number of regenerations and/or a number of regenerators used to perform the regenerations may be dependent on and/or proportional to the number of hosts 310(1)-310(n). The plurality of signals may be transmitted from the first physical layer splitter 302 to the regenerator 340 over an n-number of connections 342(1) to 342(n), which may include fiber optic cables and/or unidirectional or simplex connections, as previously described.

Upon receipt of the plurality of signals from the first physical layer splitter 302, the regenerator 340 may be configured to perform a second regeneration by regenerating each of the plurality of signals. After the plurality of signals are regenerated, the signals may be transmitted to one or more second physical layer splitters 334(1) to 334(n). The plurality of regenerated signals may be transmitted to the second physical layer splitters 334(1) to 334(n) over an n-number of connections 336(1) to 336(n), which may include fiber optic cables and/or unidirectional or simplex connections, as previously described.

The second physical layer splitters 334(1) to 334(n) may be configured to split the regenerated signals into an m-number of signals. After the regenerated signals are split by second physical splitters 334(1) to 334(n), the signals may be transmitted to an m-number of hosts 310 using an m-number of connections 338(1) to 338(m), which may include fiber optic cables and/or unidirectional or simplex connections. Upon receipt of the signals, the hosts 310 may use the trading information contained in the signals to execute a transaction.

By performing two regenerations, the system 301 may be able to provide signals containing the trading information to more hosts 310 than the system 201. For example, by performing two stages of regeneration, the number of second physical layer splitters 334(1) to 334(n) may at least double, compared to the number of second physical layer splitters 234(1) to 234(n) of the system 201. In turn, the number of hosts 310 that may receive the signals containing the trading information from the system 301 may be about twice as much as the number of hosts 210 that may receive the signals from the system 201. Additionally, the use of two stages of regeneration in system 301 may increase the amount of latency produced by about four nanoseconds, compared to the latency generated in 201, which may be relatively low and/or insignificant.

Additionally, a connection 322, such as a fiber optic cable and/or a simplex connection, may be included in the system 301 to connect an input of the L2/L3 switch 316 to an output of one of the second physical layer splitters 334(1) to 334(n). As previously described for the trading environments 100, 200, the connection 322 may connect the L2/L3 switch with one of the second physical layer splitter 334(1) to 334(n) so that from the perspective of the exchange 306, the exchange 306 is both sending information to, and receiving information from, the hosts 310 through the L2/L3 switch 316.

Figure 4:
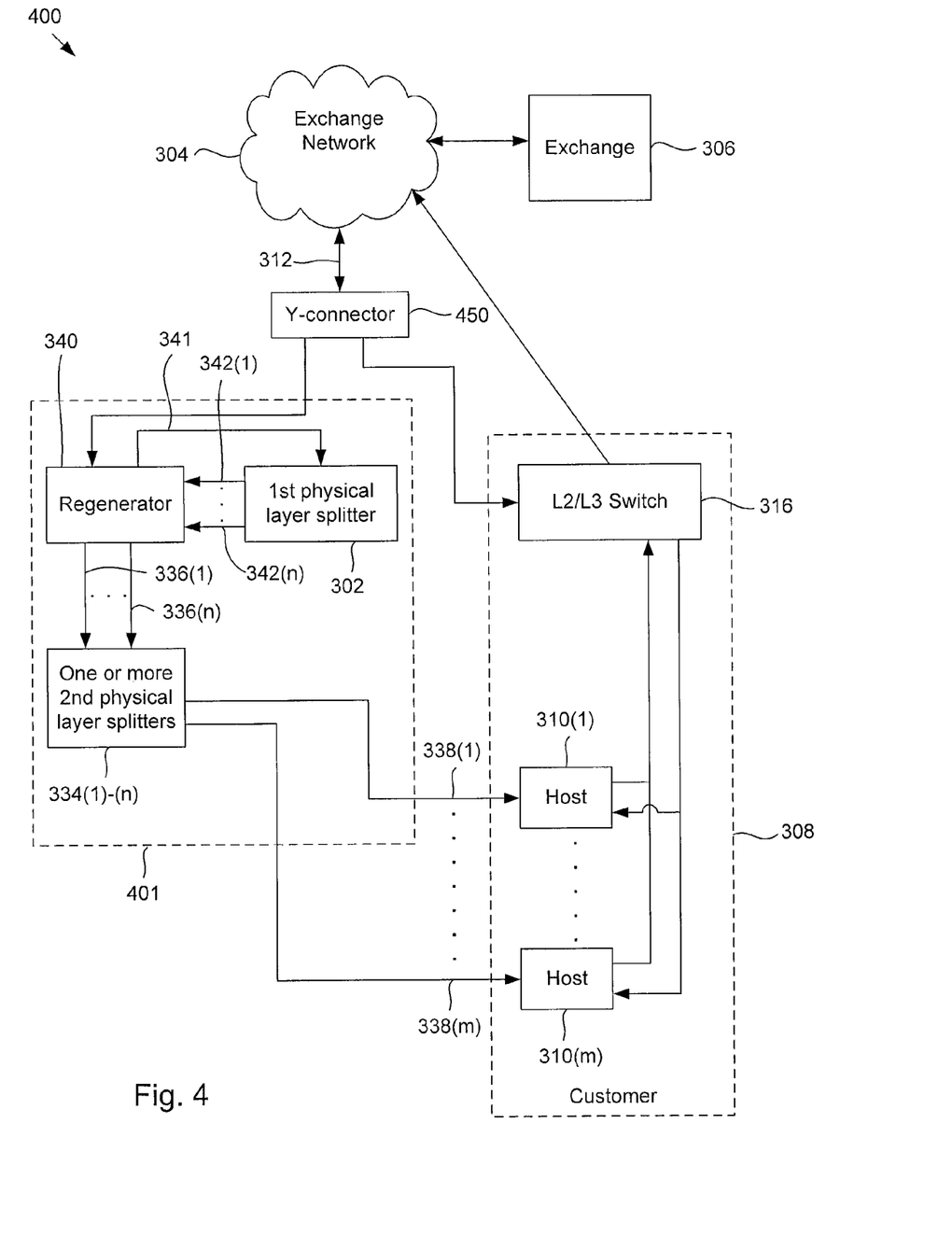
FIG. 4 illustrates a trading environment that includes a fourth example system that may be used to minimize or reduce an amount of latency produced when communicating trading information from an exchange to a customer.

FIG. 4 shows a trading environment 400 that includes an alternative example system 401 configured to minimize and/or reduce an amount of latency produced when communicating trading information from an exchange to a customer. The example system 401, which may be referred to as a physical layer splitting and/or regeneration system, is similar to the example system 301 shown in FIG. 3, except that the regenerator 340 may not receive a signal containing trading information directly from the exchange network 304. Additionally, the system 401 may not include the connection 322 that connects the L2/L3 switch 316 with an output of one of the second physical layer splitter 334(1) to 334(n).

Instead, a Y-connector 450, such as a Y-cable, or a two-port splitter or other physical layer splitter that is configured to provide two outputs, may be used and/or have outputs connected to the system 401 and to the customer 308. As shown in FIG. 4, the Y-connector 450 may be configured to receive the signal containing the trading information from the exchange network 304 and send the signal to both the regenerator 340 and an input of the L2/L3 switch 316. The Y-connector 450 may be connected to the exchange network 304 to receive the signal, such as by having an input that is connected to the connection 312. Upon reception of the signal, the Y-connector 450 may be configured to split the signal into two signals, outputting one of the split signals to each of the regenerator 340 and the L2/L3 switch 316. The two signals output from the Y-connector 450 may be the same signals as each having about half of the power level of the signal input to the Y-connector 450. In addition, the Y-connector 450 may be configured to split the signals in the same or similar manner as a physical layer splitter, such as the physical layer spitter 102, 202, or 302 as described above. Although FIG. 4 shows the Y-connector 450 as being a component separate from the system 401 that attached and/or connects to the system 401, in other embodiments, the Y-connector 450 may be part of the example system 401 that connects to other components of the system 401, such as the regenerator 340.

By connecting an output of the Y-connector 450 to an input of the system 401 (e.g., an input to the regenerator 340), and an output to an input of the L2/L3 switch 316, the system 401 may be configured with customer 308 so that the exchange 306 has the perspective that it is both sending information to, and receiving information from, the hosts 310 through the L2/L3 switch 316 without the use of the connection 322.

The trading environments 100-400 shown in FIG. 104 illustrate an environment where the customer communicates over the exchange network using a single network connection, such as a network connection established through a single L2/L3 switch. In these environments, however, the customer's trading activities, such as the transmission of executed transactions to the exchange network, may be monitored by other customers, such as those that are co-located. To prevent other customers from monitoring the customer's trading activities, multiple connections may be established between the exchange network and the customer—one network connection for communicating the trading information from the exchange network to the customer, and a second network connection for communicating the executed transaction information from the customer to the exchange network.

Figure 5:
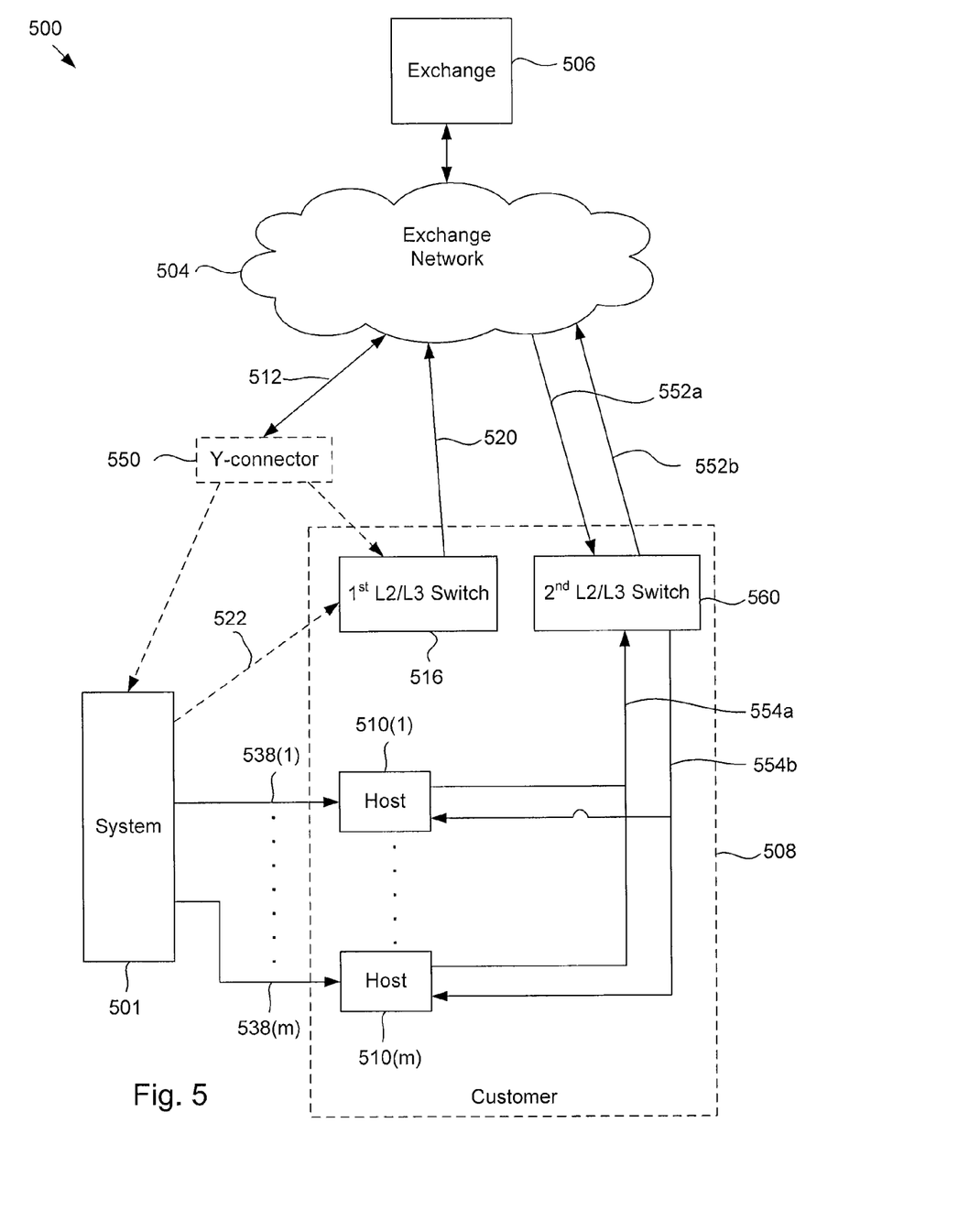
FIG. 5 illustrates an alternative trading environment where two network connections are used to connect a customer to an exchange network.

FIG. 5 shows an alternative trading environment 500 that includes multiple connections established between an exchange network 504 and a customer 508. The alternative trading environment may include an example system 501, which may be referred to as a physical layer splitting and/or regeneration system, configured to minimize and/or reduce an amount of latency produced when communicating trading information from the exchange 506 to the customer 508. The example system 501 may include any of the example systems 101, 201, 301, or 401 as described above with respect to FIGS. 1-4. The system 501 may optionally be connected to a Y-connector 550 (denoted by dotted lines), like the system 401 shown in FIG. 4. Alternatively, may optionally include a connection 522 (also denoted by dotted lines) that connects the system 501 with a L2/L3 switch 516.

In the alternative trading environment 500, two pairs of connections or duplex connections may be used to establish to network connections between the exchange network 504 and the customer. The two pairs of connections may include a first pair of connections or duplex connection, which may include a connection 512 and a connection 520. The first pair of connections 512, 520 may be used to send the trading information from the exchange network 504 to the customer 508. A second pair of connections or a duplex connection may include connections 552a, 552b, which may be configured to provide information regarding executed transactions from the customer 508 to the exchange 506. The customer 508 may include a second L2/L3 switch 560 to communicate the information regarding executed transactions from hosts 510(1) to 510(m) to the exchange network 504. The hosts 510(1) to 510(m) may provide the executed transaction information to the second L2/L3 switch 560 through one or more connections 554, and the L2/L3 switch 560, in turn, may communicate the executed transaction information over the exchange network 504 to the exchange 506.

Figure 6:
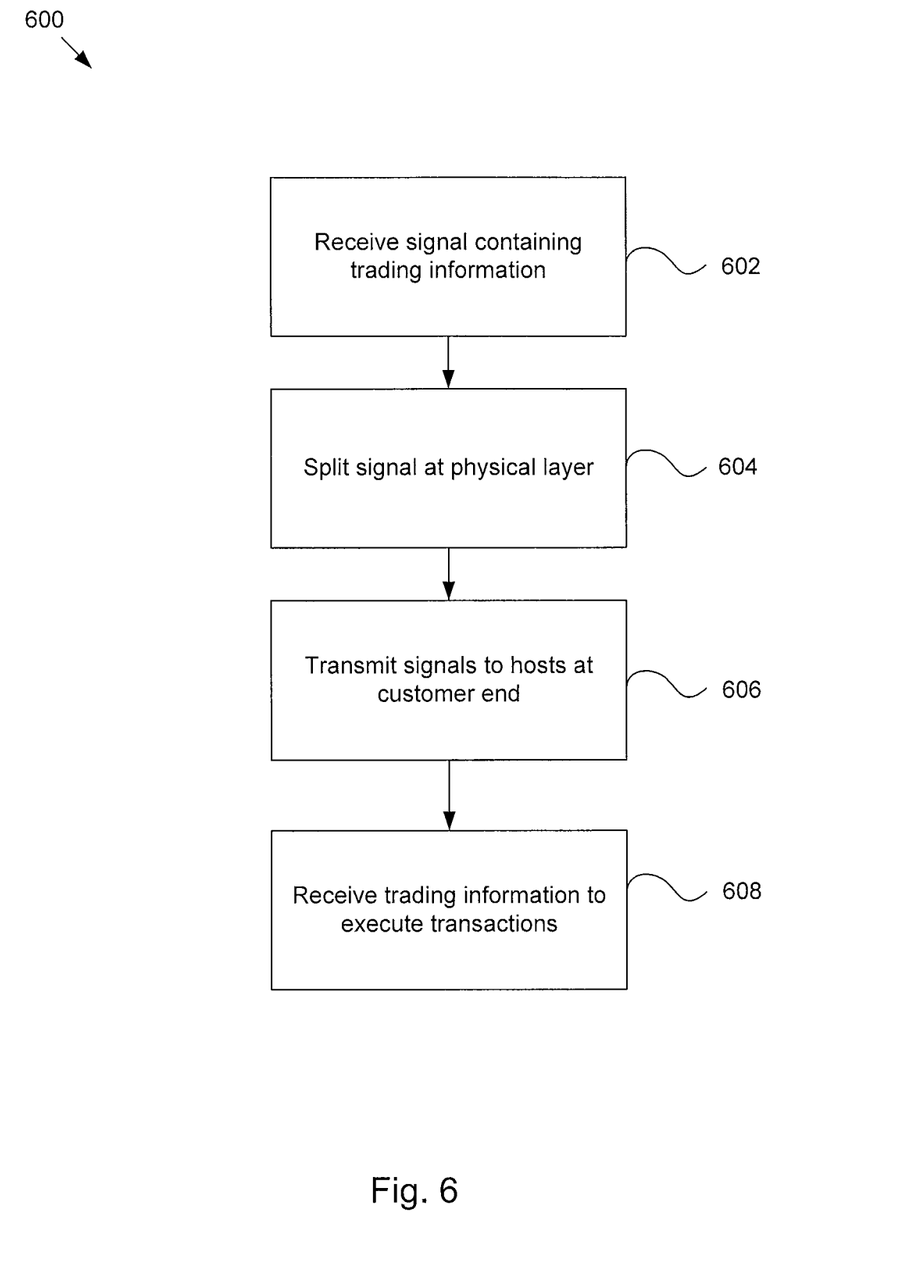
FIG. 6 illustrates a flow diagram of an example method of minimizing or reducing an amount of latency produced when communicating trading information from an exchange to a customer.

FIG. 6 shows a flow diagram of an example method 600 of minimizing or reducing latency generated when communicating trading information from an exchange network to a customer. At block 602, a signal, such as an optical signal, containing trading information may be received from over an exchange network by a physical layer splitter. At block 604, the signal may be split into a plurality of signals, such as by using the physical layer splitter. The split may be performed at the physical layer. At block 606, the plurality of signals may be transmitted to a plurality of hosts at the customer end. At block 608, the signals may be received by the hosts, and the trading information contained in the signals may be used to execute transactions, such as by using one or more trading algorithms.

Figure 7:
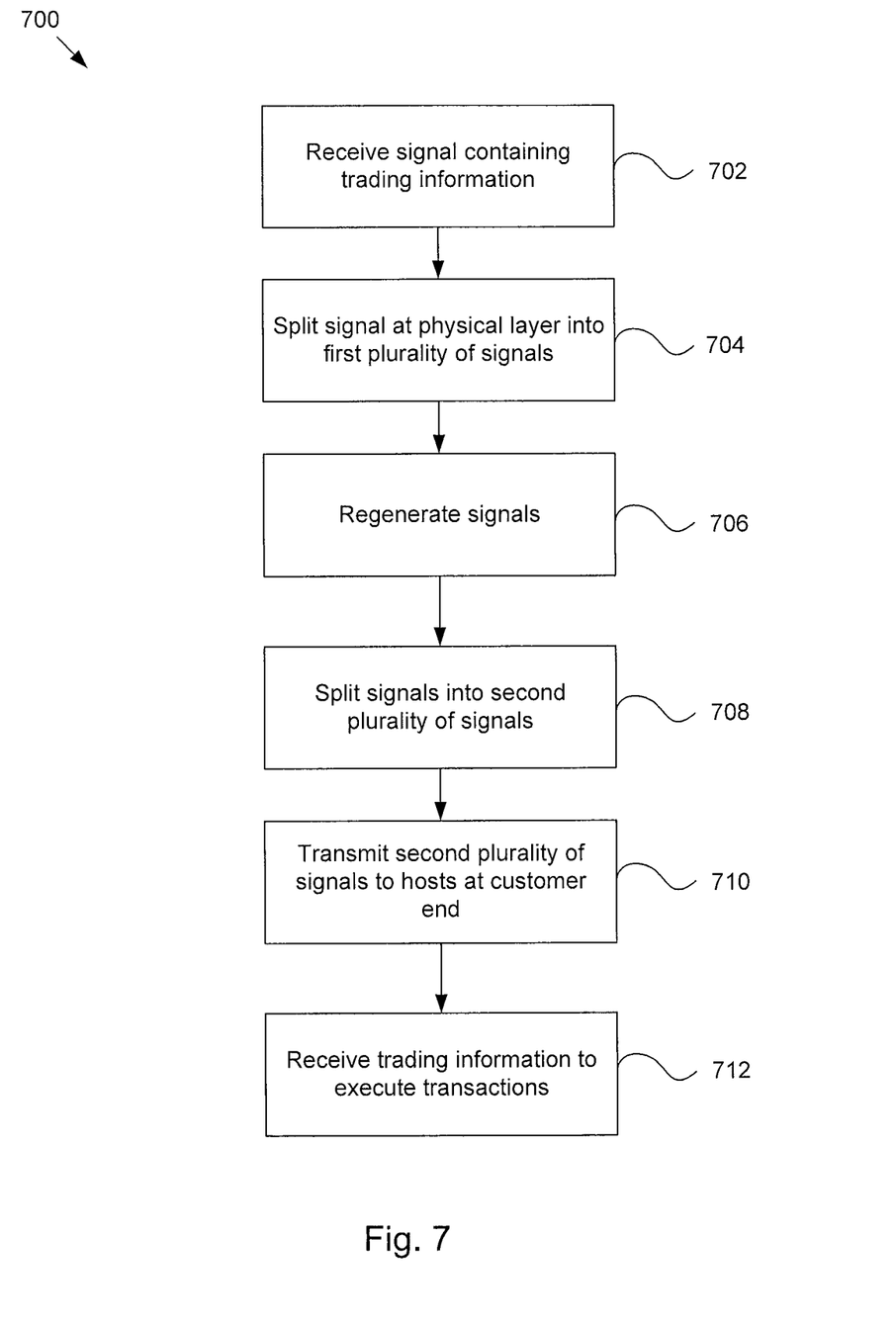
FIG. 7 illustrates a flow diagram of a second example method of minimizing or reducing an amount of latency produced when communicating trading information from an exchange to a customer.

FIG. 7 shows a flow diagram of a second example method of minimizing or reducing latency generated when communicating trading information from an exchange network to a customer. At block 702, a signal, such as an optical signal, containing trading information may be received from over an exchange network by a first physical layer splitter. At block 704, the signal may be split into a plurality of signals, such as by using the first physical layer splitter. The split may be performed at the physical layer. At block 706, the first plurality of signals may be regenerated, such as by using a regenerator. At block 708, the generated first plurality of signals may be split into a second plurality of signals, such as by using one or more second physical layer splitters. At block 710, the second plurality of signals may be transmitted to a plurality of hosts at the customer end. At block 712, the second plurality of signals may be received by the hosts, and the trading information contained in the signals may be used to execute transactions, such as by using one or more trading algorithms.

Figure 8:
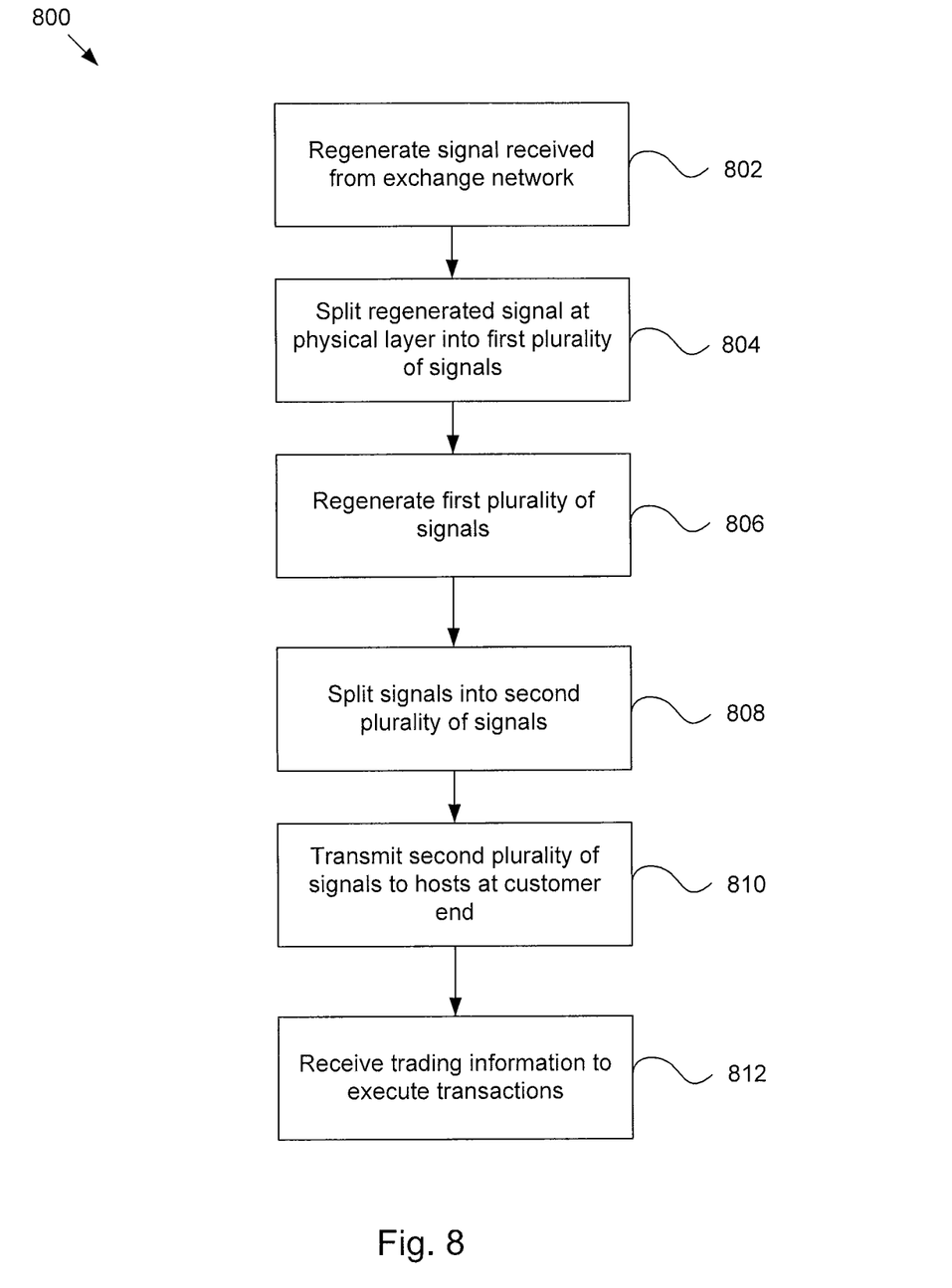
FIG. 8 illustrates a flow diagram of a third example method of minimizing or reducing an amount of latency produced when communicating trading information from an exchange to a customer.

FIG. 8 shows a flow diagram of a third example method of minimizing or reducing latency generated when communicating trading information from an exchange network to a customer. At block 802, a signal, such as an optical signal, received from over an exchange network and containing trading information may be regenerated, such as by using a first regenerator. At block 804, the regenerated signal may be split into a first plurality of signals, such as by using a first physical layer splitter. At block 806, the first plurality of signals may be regenerated, such as by using the first regenerator or alternatively, by using a second regenerator that is different than the first regenerator. At block 808, the regenerated first plurality of signals may be split into a second plurality of signals, such as by using one or more second physical layer splitters. At block 710, the second plurality of signals may be transmitted to a plurality of hosts at the customer end. At block 712, the second plurality of signals may be received by the hosts, and the trading information contained in the signals may be used to execute transactions, such as by using one or more trading algorithms.

Figure 9:
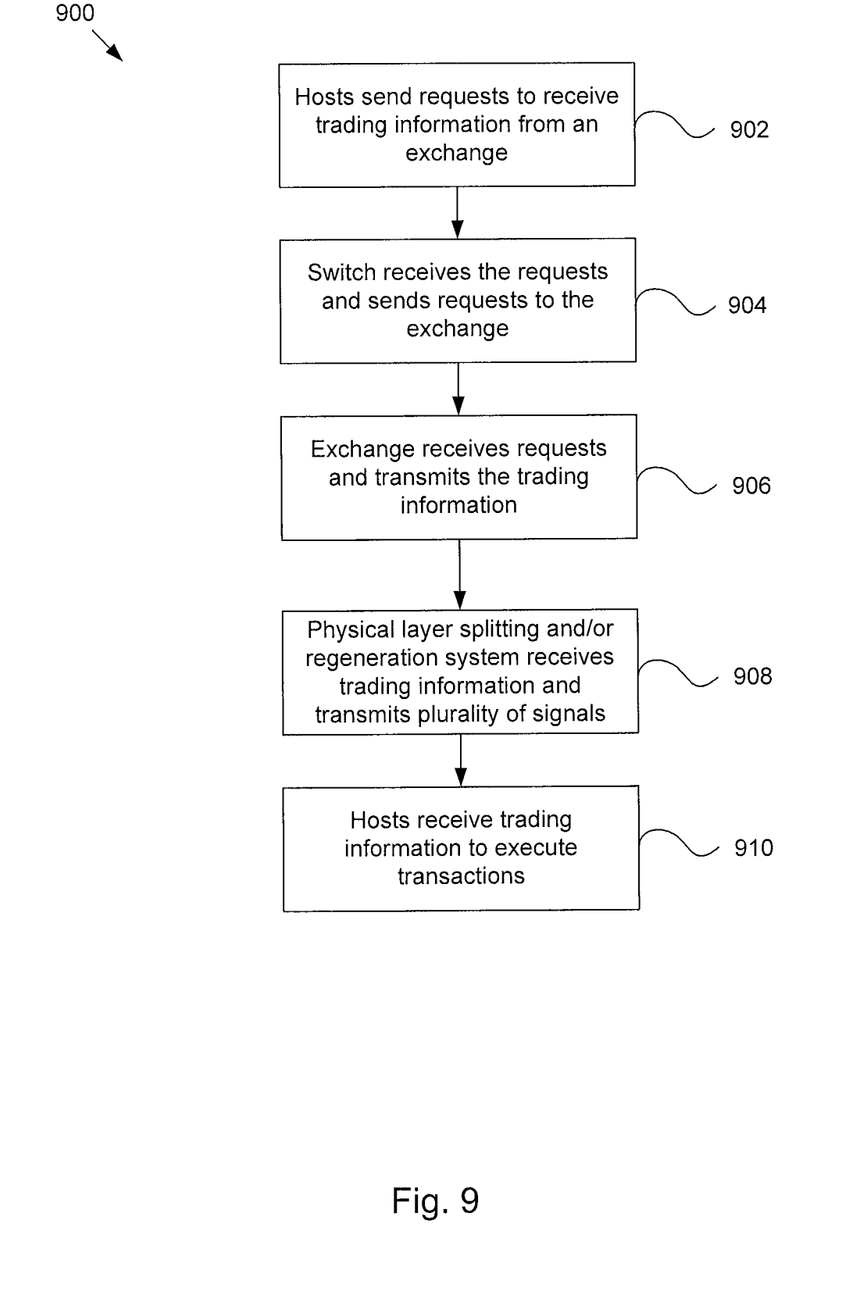
FIG. 9 illustrates a flow diagram of a fourth example method of minimizing or reducing latency when communicating trading information from an exchange network to a customer.

FIG. 9 shows a flow diagram of a fourth example method of minimizing or reducing latency generated when communicating trading information from an exchange network to a customer. At block 902, one or more hosts may send one or more requests to receive trading information from an exchange and/or from over an exchange network. In some example configurations, the requests may be in the form of IGMP host membership reports to receive multicast information or traffic from the exchange. The one or more hosts may send the one or more requests to a switch, such as an L2/L3 switch, at the customer end. The requests may be sent over a duplex connection.

At block 904, the switch may receive the requests, and in response, may send the requests to the exchange. In some configurations, when the requests are received in the form of IGMP host membership reports, the switch may generate one or more PIM joins, or IGMP join group commands, including static IGMP join group commands, and may sends the one or more joins or join group commands to the exchange. At block 906, the exchange may receive the requests (e.g., the join or join group commands) from the switch, and in response, may send the trading information and/or other information using an optical signal to a physical layer splitting and/or regeneration system to split and/or regenerate the signal one or more times as described above. In some example configurations, the exchange may send the trading information in the form of a multicast. At block 908, the physical layer splitting and/or regeneration system may transmit a plurality of signals to a plurality of hosts at the customer end. At block 910, the plurality of signals may be received by the hosts, and the trading information contained in the signals may be used to execute transactions, such as by using one or more trading algorithms.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:
1. A system comprising:
a first physical layer splitter configured to:
  receive a signal from over an exchange network, the signal containing trading information; and
  split the signal at a physical layer into a first plurality of signals;
a first low latency regenerator configured to:
  receive the first plurality of signals from the first physical layer splitter; and
  regenerate the first plurality of signals through an optical-electrical-optical process to increase power levels of the first plurality of signals to produce regenerated first plurality of signals; and
  transmit the regenerated first plurality of signals with increased power levels toward a plurality of hosts to execute one or more transactions, wherein a latency through the first physical layer splitter and the first low latency regenerator is between 6 to 9 nanoseconds.
2. The system of claim 1,
wherein the first low latency regenerator is further configured to:
  receive the signal from over the exchange network;
  regenerate the signal; and
  send the signal to the first physical layer splitter after regeneration of the signal.

3. The system of claim 2, further comprising a second low latency regenerator.

4. The system of claim 2, further comprising:
a Y-connector configured to:
receive the signal sent from the exchange network;
send the signal to the first low latency regenerator and to a Layer 2/Layer 3 switch at a customer end.

5. The system of claim 1, wherein the signal comprises an optical signal, and wherein at least the first physical layer splitter comprises an optical splitter.

6. The system of claim 1, wherein at least the first physical layer splitter comprises a passive optical splitter.

7. The system of claim 1, wherein the first low latency regenerator is configured to regenerate the first plurality of signals at the physical layer.

8. The system of claim 1, further comprising:
one or more second physical layer splitters configured to:
receive the regenerated first plurality of signals from the first low latency regenerator;
split the regenerated first plurality of signals at the physical layer into a second plurality of signals; and
transmit the second plurality of signals to a plurality of hosts;
wherein a latency through the first physical layer splitter, the first low latency regenerator, and the second physical layer splitter is between 8 to 14 nanoseconds.

9. The system of claim 8, further comprising:
a connection that connects an output of one of the one or more second physical layer splitters to an input of a Layer 2/Layer 3 switch at a customer end.

10. The system of claim 8, wherein a simplex connection is utilized to transmit each signal of the second plurality of signals from the one or more second physical layer splitters to the plurality of hosts.

11. A method comprising:
splitting at a physical layer, with a first physical layer splitter, a signal into a first plurality of signals, the signal being received from over an exchange network;
receiving, with a low latency regenerator device, the first plurality of signals from the first physical layer splitter;
regenerating, with the low latency regenerator device using an optical-electrical-optical process, the first plurality of signals to increase power levels of the first plurality of signals to produce regenerated first plurality of signals;
transmitting the regenerated first plurality of signals with increased power levels toward a plurality of hosts to execute one or more transactions, wherein a latency through the first physical layer splitter and the low latency regenerator device is between 6 to 9 nanoseconds.

12. The method of claim 11, further comprising:
receiving, at the low latency regenerator, the signal from the exchange network;
regenerating the signal; and
sending the signal to the first physical layer splitter after regeneration of the signal.

13. The method of claim 11, wherein splitting, at the physical layer, the signal into a first plurality of signals comprises making copies of an optical signal through mirroring.

14. The method of claim 11, wherein regenerating the first plurality of signals comprises regenerating the first plurality of signals at the physical layer.

15. The method of claim 11, further comprising:
splitting at the physical layer the regenerated first plurality of signals into a second plurality of signals with one or more second physical layer splitters; and
transmitting the second plurality of signals to the plurality of hosts,
wherein a latency through the first physical layer splitter, the low latency regenerator device, and the second physical layer splitter is between 8 to 14 nanoseconds.

16. A system comprising:
a first optical splitter configured to:
receive an optical signal from a fiber optic cable; and
mirror the optical signal to generate a first plurality of optical signals; and
a low latency regenerator device configured to:
receive the first plurality of optical signals from the first optical splitter;
regenerate the first plurality of optical signals through an optical-electrical-optical process to increase power levels of the first plurality of optical signals to produce regenerated first plurality of optical signals; and
transmit the regenerated first plurality of optical signals with increased power levels toward a plurality of hosts to execute one or more transactions, wherein a latency through the first optical splitter and the low latency regenerator device is between 6 to 9 nanoseconds.

17. The system of claim 16, wherein the low latency regenerator device is further configured to:
receive the optical signal from an exchange network;
regenerate the optical signal; and
send the optical signal to the first optical splitter after regeneration of the optical signal.

18. The system of claim 17, further comprising:
a Y-connector configured to:
receive the optical signal from the exchange network; and
send the optical signal to the low latency regenerator device and to a Layer 2/Layer 3 switch at a customer end.

19. The system of claim 16, wherein the low latency regenerator device is configured to regenerate the first plurality of optical signals at a physical layer.

20. The system of claim 16, further comprising:
one or more second optical splitters configured to:
receive the regenerated first plurality of optical signals from the low latency regenerator device;
mirror the regenerated first plurality of optical signals to generate a second plurality of optical signals; and
transmit the second plurality of optical signals to the plurality of hosts, wherein a latency through the first optical splitter, the low latency regenerator device, and the second optical splitter is between 8 to 14 nanoseconds.

21. The system of claim 20, further comprising:
a connection that connects an output of one of the one or more second optical splitters to an input of a Layer 2/Layer 3 switch at a customer end.

* * * * *